E. Parker.

Knob Attachment.

No. 1,707. Reissued Jun. 21, 1864.

Witnesses
Alf. A. Robinson
Jeremy W. Bligh

Inventor
Emery Parkes

N. PETERS, PHOTO-LITHOGRAPHER, WASHINGTON, D. C.

UNITED STATES PATENT OFFICE.

EMERY PARKER, OF MERIDEN, CONNECTICUT.

IMPROVEMENT IN MODES OF ATTACHING DOOR-KNOBS TO SPINDLES.

Specification forming part of Letters Patent No. 38,406, dated May 5, 1863; Reissue No. 1,707, dated June 24, 1864.

*To all whom it may concern:*

Be it known that I, EMERY PARKER, of Meriden, county of New Haven, and State of Connecticut, have invented a new and useful Improvement in Door-Knobs, or in Attaching Door-Knobs to Spindles; and I do hereby declare that the following is a full, clear, and exact description of the same, reference being made to the accompanying drawings and specification, in which similar letters indicate like parts throughout the figures.

My invention is an improvement in that class of door-knobs, or in the mode of attaching door-knobs to the spindle, in which the spindle is adjusted as to length by a greater or less degree of insertion into the knobs in order to suit doors of differing thickness, which adjustment is effected by screwing the spindle in to the desired distance, and then, by some device, usually a screw or pin inserted through the shank of the knob into a groove in the spindle, both are prevented from turning on each other. This screw or pin is apt to work loose as well as to hurt the hand. By my improvement the spindle may be adjusted to within one-quarter of the pitch of the thread, in which also there is no pin, screw, or other device exposed which can work out or be visible when the knobs are in place, as will be apparent from the following description of the construction.

Figure 2:
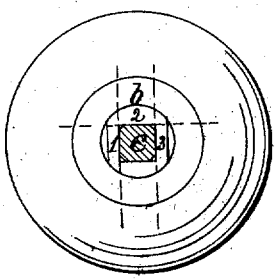

The spindle is made square and has the thread cut on the corners only, and the knob is tapped with a female screw in the usual manner. The face of the shank of the knob is partially cut in, as shown at *a* in Figure 4, to receive a clamp piece of metal wholly or in part like *b*, (shown at Fig. 3,) which fills the part cut away on one, two, or three sides of the spindle, as shown in Fig. 2. When this is in place, it is obvious that the knob cannot be turned on the spindle.

Figure 1:
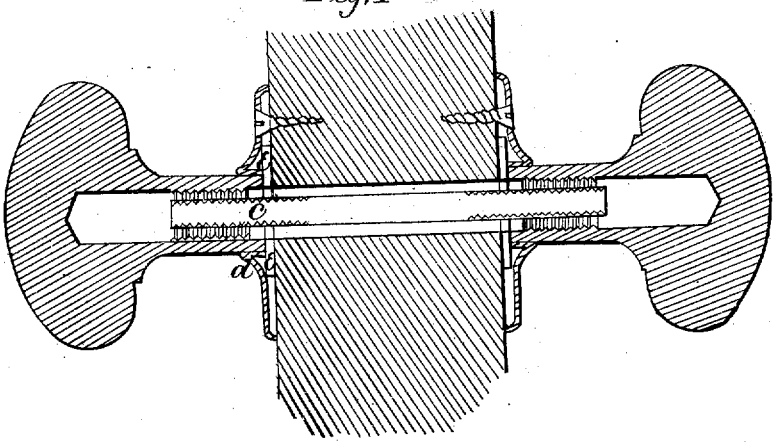

To secure the piece *b* in place the escutcheon affixed to the door is made thick enough at that part to cover the piece of metal, as seen at *d*, Fig. 1, the opening in the escutcheon being but just large enough to admit the end of the shank of the knob, and to secure against the end of the shank wearing into the wood of the door I have provided an independent washer, *e*, which is put onto the spindle before it is inserted into the knob-shank. Said washer *e* may be dispensed with, but I believe it will prove to be more durable and keep in better order with the use of the washer.

In operation the washer *e* is first put onto the spindle, the escutcheon slipped as far back on the shank of the knob as it will go, the knob is then screwed onto the spindle, which projects through the door up to the desired position, the piece *b* is next put in, and the escutcheon is moved to the door over the washer *e* and secured thereto by screws in the usual way, thus securing the piece *b* in place, inclosing entirely the means by which the knob is prevented from turning on the spindle.

It is not necessary that the piece *b* shall have the precise form shown, as it will be evident that any form will suffice which will, when held in place by the collar or thick part of the escutcheon, prevent the knob from being turned. What I mean by this is, the piece *b* may be made in one, (1,) two, (2,) or three (3) pieces, as shown by dissecting with red lines and marked with letters and figures in red ink in Figs. 2 and 3.

Figure 3:
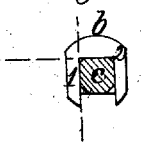
Figure 4:
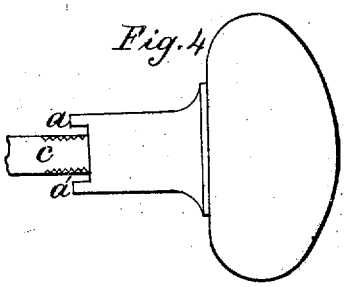
Figure 5:
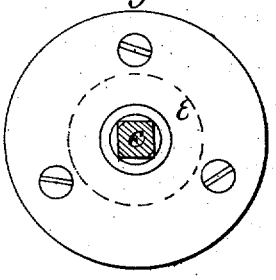

In Fig. 2 either of the three pieces designated by figures 1, 2, and 3 is deemed abundantly sufficient, in combination with the escutcheon, to accomplish the desired object. In Fig. 3 the piece is made (marked 2) of such shape as to fit the aperture of the shank and two sides of the spindle. Thusit will be readily seen that it is not necessary that this piece *b* should be made of any particular form or shape, because a straight bar or key inserted through the end of the knob-shank and on one side of the spindle only, will fully accomplish the desired object.

Having thus described my invention, I shall state my claim as follows:

1. In combination with a screw-threaded knob and the screw-threaded angular spindle, the key or clamp-piece *b*, or its equivalent, fitting a recess in the end of the shank located entirely within the escutcheon and concealed thereby from view, in the manner and for the purpose substantially as set forth.

2. The employment of the independent washer *e* in combination with the spindle, escutcheon, knob-shank, and metal piece *b*, when constructed and arranged, substantially as and for the purpose described.

EMERY PARKER.

Witnesses:

ALFRED S. ROBINSON,
JEREMY W. BLISS.